United States Patent Office 2,836,497
Patented May 27, 1958

2,836,497

EDIBLE COMPOSITION OF VEGETABLE OIL EMULSION AND BUTTER FAT EMULSION CONVERTIBLE BY AERATION INTO A STIFF MASS

Harry M. Levin, Philadelphia, Pa.

No Drawing. Application December 21, 1954
Serial No. 476,831

9 Claims. (Cl. 99—118)

My invention is a free-flowing edible composition having as its major components an acidulous, semi-plastic vegetable oil emulsion with an aqueous continuous phase, a liquid butter fat emulsion having an aqueous continuous phase, and a compressed inert gas. Such composition, when aerated, forms a semi-permanent cellular mass of minuscule, and preferably microscropic, bubbles, which have thin, taut, relatively strong film walls. The aerated mass is substantially devoid of free, slack liquid, has a density and stiffness analogous to that of whipped cream, and is non-flowing or slow flowing.

Preferably my free-flowing composition is packaged under pressure, and is chilled, and its aeration effected by the release of such pressure and the discharge of the composition through a restricted orifice.

My invention provides the housewife with a composition for the rapid preparation of a food dressing having physical characteristics of a whipped cream dressing and having taste and economic characteristics of mayonnaise or of salad dressing. Due largely to their thixotropic properties, mayonnaise and salad dressing are inherently incapable of being effectively aerated or entrained in an escaping stream of expanding gas to form a semi-permanent cellular mass of minute bubbles, or of otherwise being transformed into such a mass and plasticity of mayonnaise and salad dressing causes their adhesion to the bottom and inner wall of a pressure container and permits free escape of gas without entrainment of appreciable amounts of the mayonnaise or salad dressing.

The acidulous vegetable oil emulsion used as a constituent of my present composition may be a standard mayonnaise or a standard salad dressing, but is preferably a comestible devoid of starch prepared in accordance with my application No. 343,811, issued as Patent No. 2,715,068. Such comestible comprises a semi-plastic, acidulated base having as its principal nutritious constituents a standard mayonnaise and a pasteurized aqueous dispersion of dry defatted milk solids stabilized with edible gum, and if desired, enriched with butter fat.

In accordance with my present invention, a semi-plastic, acidulous, vegetable oil emulsion, whether mayonnaise, salad dressing, or the comestible above referred to, is dispersed in a butter fat emulsion having a butter fat concentration in a continuous aqueous phase such that its aqueous phase, plus the free water, if any, of the vegetable oil emulsion, will render the composition free-flowing but will not impair the whipping characteristics of the butter fat emulsion or the capacity of the bubble walls formed therefrom and from the emulsifying colloids to support the particles of the dispersed phase of the vegetable oil emulsion.

The butter fat emulsion is preferably used in the form of a 30% to 40% sweet whipping cream which is combined with the acidulous, vegetable oil emulsion in such proportions as to produce a composition which is free-flowing, and non-plastic viz., having a viscosity (measured by a Brookfield viscosimeter), say of the order of 35,000 to 40,000 centipoises at 70–75 degrees F. and a surface tension of the order of 60–65 dynes per cm. The proportions of the 30% to 40% whipping cream to the acidulous vegetable oil emulsion will vary with the characteristics of the latter, but I have found it advantageous to combine about four gallons of such whipping cream with (a) two gallons of standard mayonnaise and six gallons of standard salad dressing; or with (b) eight gallons of standard salad dressing; or with (c) two gallons of mayonnaise and six gallons of the comestible of my application Serial No. 343,811, issued as Patent No. 2,715,068; or with (d) eight gallons of such comestible.

The proportion of such whipping cream should generally not be less than about 15% of the total composition prepared as above described.

I have, however, found that the addition of excess emulsifiers and absorbents, such, for instance, as egg yolk or dry milk solids, may permit use of the butter fat emulsion in the form of table cream. Milk solids as used in the composition of my application Serial No. 343,811, issued as Patent No. 2,715,068, protect the stabilization of the butter fat emulsion and vegetable oil emulsion and improve the whipping qualities of the composition.

The ingredients are combined by gentle mixing, preferably at room temperature, say 70° F., to avoid the formation of bubbles or precipitation. The cream is then free-flowing and dilutes the mayonnaise, salad dressing or above comestible mixed therewith by separating the globules colloidally without breaking or reversing the emulsions.

The free-flowing product is packaged in a usual type of aerosol pressure cans having an acid resisting, internal lining, and having a restricted orifice controlled by a nozzle. Such a can may be filled from one-half to five-eighths full of my free-flowing composition and, thereafter the can is filled with an inert gas, such for instance as carbon dioxide, nitrous oxide, or nitrogen, or a blend thereof, up to a pressure of say 90 pounds per square inch at 70° F.

The product may be chilled by refrigeration prior to use, and is further chilled by expansion of escaping gas and liquid when the nozzle is pressed to open the orifice. The chilled composition will, when shaken, flow freely toward the nozzle when the latter is downturned. The chilling of, and the ebullition of the gas through, the liquid composition at the nozzle mouth, and the commingling of the gas and entrained liquid, produces a mass of whipped, stiff, dressing composed of minute bubbles which remain stable for several hours at least, and hold about 50% of the volume of the mass as gas.

The density of the whip or foam formed by the aeration of my composition results largely from the minute division of the air cells, butter fat masses, and the vegetable oil globules, their close contiguity, and the avoidance of breaking the respective emulsions. The breaking point of the emulsion occurs in mayonnaise or salad dressings when the dispersion creates minute oil globules in excess of the emulsifying capacity of the stabilizing emulsifiers, or when there is too little moisture to prevent the coalescence of minute globules. The occurrence of the breaking point frequently results in the conversion of an oil in water emulsion into a water in oil emulsion and it is essential to my invention that this conversion be prevented but that the minute vegetable oil globules and butter fat globules should be homogeneously dispersed in a continuous phase adequately stabilized by egg yolk, milk solids or other suitable colloids and forming minute air cells in close contiguity with the fat masses.

Having described my invention, I claim:

1. A fluid composition having as its major components a stabilized edible acidulous vegetable oil emulsion having a continuous aqueous phase, an edible butter fat emulsion having an aqueous continuous phase, and an edible gas under pressure; said combined emulsions being free flowing and having a surface tension of the order of 60–65 dynes per cm. and being convertible by the expansion of said gas into a semi-permanent, cellular mass of minuscule bubbles with relatively strong, thin film walls entrapping said gas, said mass having a density analogous to that of whipped cream.

2. A liquid composition having as its major components an intimately mixed stabilized edible vegetable oil emulsion having an aqueous continuous phase and a stabilized edible butter fat emulsion having an aqueous continuous phase, and milk solids in excess of the amounts requisite for the stabilization of said emulsions, said composition being free flowing and convertible by aeration into a dense mass of minuscule bubbles.

3. In a method of making a dense, foamy food dressing, the steps which include intimately combining a stabilized semi-plastic, acidulous, edible vegetable oil emulsion having water as its continuous phase and an edible, liquid butter fat emulsion having an aqueous continuous phase to form a free flowing mix, and confining such mix and an edible gas under high pressure.

4. An edible fluid composition having as its major components an intimately mixed, stabilized, acidulous vegetable oil emulsion having an aqueous continuous phase, and an edible butter fat emulsion having an aqueous continuous phase, said butter fat emulsion being not less than about 15% of the total composition, said composition being free flowing and convertible by aeration into a dense mass of minuscule bubbles having physical characteristics analogous to that of whipped cream and having taste characteristics of mayonnaise.

5. An edible fluid composition as set forth in claim 4 in which the said vegetable oil emulsion is a standard mayonnaise.

6. An edible fluid composition as set forth in claim 4 in which the said vegetable oil emulsion is an intimate mixture of standard mayonnaise and salad dressing.

7. An edible fluid composition as set forth in claim 4 in which the said vegetable oil emulsion is a comestible devoid of starch and having as its principal nutritious constituents a standard mayonnaise and a pasteurized aqueous dispersion of dry defatted milk solids stabilized with an edible gum.

8. An edible fluid composition as set forth in claim 4 through 9 in which the said butter fat emulsion is a 30% to 40% sweet whipping cream.

9. An edible fluid composition having as its major components an edible butter fat emulsion in a continuous aqueous phase, a stabilized semi-plastic acidulous vegetable oil emulsion dispersed in said butter fat emulsion, and an edible gas under pressure, the continuous aqueous phase of said butter fat emulsion being such that the composition will be rendered free flowing but will not impair the whipping characteristics of the butter fat emulsion when subjected to the expansion of said gas or the capacity of the bubble walls formed by the expansion of said gas and from the emulsifying colloids to support the particles of the dispersed phase of said vegetable oil emulsion.

References Cited in the file of this patent

UNITED STATES PATENTS

| | | |
|---|---|---|
| 2,155,260 | Diller | Apr. 18, 1939 |
| 2,170,417 | Levin | Aug. 22, 1939 |
| 2,250,300 | Goosmann | July 22, 1941 |
| 2,264,593 | Schapiro | Dec. 2, 1941 |
| 2,294,172 | Getz | Aug. 25, 1942 |
| 2,435,682 | Getz | Feb. 10, 1948 |

OTHER REFERENCES

"The Boston Cooking-School Cook Book," by Fannie Farmer, 1922, page 326.

De Gouy: "The Gold Cook Book," published by Greenberg (New York), 1943, (pp. 830, 831 and 834 relied on).